United States Patent
Stark et al.

(12) 
(10) Patent No.: US 6,720,387 B1
(45) Date of Patent: Apr. 13, 2004

(54) HOT-MELT ADHESIVE COMPOSITIONS COMPRISING ACIDIC POLYMER AND BASIC POLYMER BLENDS

(75) Inventors: Peter A. Stark, Cottage Grove, MN (US); Audrey A. Sherman, St. Paul, MN (US); Albert I. Everaerts, Oakdale, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 412 days.

(21) Appl. No.: 09/025,607

(22) Filed: Feb. 18, 1998

(51) Int. Cl.⁷ ................... C08L 35/02; C08L 33/02; C08L 33/24; B32B 7/12

(52) U.S. Cl. ................ 525/203; 525/205; 525/209; 525/212; 525/218; 525/221; 428/346; 428/349; 428/352; 428/354; 428/355 AC

(58) Field of Search ................ 525/203, 205, 525/207, 212, 218, 221; 428/346, 349, 352, 354, 355 AC

(56) References Cited

U.S. PATENT DOCUMENTS

| | | | |
|---|---|---|---|
| RE24,906 E | 12/1960 | Ulrich | 526/328.5 |
| 3,574,153 A | 4/1971 | Sirota | 428/350 |
| 3,925,282 A | 12/1975 | Davis et al. | 524/272 |
| 4,018,733 A | 4/1977 | Lopez et al. | 156/327 |
| 4,045,517 A | 8/1977 | Guerin et al. | 525/203 |
| 4,152,189 A | 5/1979 | Guerin et al. | 156/331 |
| 4,354,008 A | 10/1982 | Skoultchi | 525/370 |
| 4,360,638 A | 11/1982 | Bartman | 524/286 |
| 4,404,246 A | 9/1983 | Charbonneau et al. | 428/212 |
| 4,423,182 A | 12/1983 | Bartman | 524/367 |
| 4,551,388 A | 11/1985 | Schlademau | 428/355 |
| 4,554,324 A | 11/1985 | Husman et al. | 525/301 |
| 4,619,979 A | 10/1986 | Kotnour et al. | 526/88 |
| 4,396,675 A | 11/1986 | Groff | 428/355 |
| 4,737,559 A | 4/1988 | Kellen et al. | 526/291 |
| 4,832,984 A | 5/1989 | Hasegawa et al. | |
| 4,833,179 A | 5/1989 | Young et al. | 522/183 |
| 4,843,134 A | 6/1989 | Kotnour et al. | 526/318.4 |
| 4,851,278 A | 7/1989 | Enanoza | 428/195 |
| 5,006,582 A | 4/1991 | Mancinelli | 524/271 |
| 5,187,235 A | 2/1993 | Bordoloi et al. | 525/305 |
| 5,225,470 A | 7/1993 | Mancinelli | 524/271 |
| 5,252,662 A | 10/1993 | Su et al. | 524/549 |
| 5,384,341 A | 1/1995 | Itagaki et al. | 522/111 |
| 5,387,667 A | 2/1995 | Markle et al. | 528/374 |
| 5,416,127 A | 5/1995 | Chandran et al. | 522/149 |
| 5,552,451 A | 9/1996 | Everaerts et al. | 522/46 |
| 5,612,136 A * | 3/1997 | Everaerts et al. | 525/218 |
| 5,637,646 A | 6/1997 | Ellis | 525/309 |
| 5,747,145 A * | 5/1998 | Sorriero et al. | 525/217 |
| 5,776,649 A * | 7/1998 | Sorriero et al. | 430/126 |
| 5,861,211 A * | 1/1999 | Thakkar et al. | 428/343 |
| 5,905,099 A * | 5/1999 | Everaerts et al. | 526/328 |

FOREIGN PATENT DOCUMENTS

| | | | |
|---|---|---|---|
| EP | 0 375 447 A1 | 6/1990 | |
| EP | 0 578 082 A2 | 1/1994 | |
| EP | WO 98/03208 | 1/1998 | ........... A61L/15/58 |
| JP | 50-139135 | 11/1975 | ............. C09J/3/14 |
| JP | 51-19035 | 2/1976 | ............. C09J/3/14 |
| JP | 54-88938 | 7/1979 | ............. C09J/3/14 |
| JP | 60-176663 | 8/1985 | |
| JP | 11-164878 | 6/1999 | |
| WO | WO 87/00190 A1 | 1/1987 | |
| WO | WO 96/05813 | 2/1996 | ............. A61K/9/70 |
| WO | WO 96/07522 | 3/1996 | ........... B29B/13/02 |
| WO | WO 97/33945 | 9/1997 | ............. C09J/4/00 |
| WO | WO 98/03208 | 1/1998 | |
| WO | WO 98/51754 | 11/1998 | .......... C09J/133/06 |

OTHER PUBLICATIONS

Bartman, Benjamin, "High–Performance Acrylic Hot–Melt Pressure–Sensitive Adhesives," *Tappi Paper Synthetics Conference*, Sep. 26–28, 1983, pp. 169–172.

Beaulieu, Ann Hecht, David R. Gehman and William J. Sparks, "Recent Advances in Hot Melt, Pressure–Sensitive Adhesive Technology," *Tappi Journal*, Sep., 1984, vol. 67, No. 9, pp. 102–105.

Mancinelli, Paul A., "Advancements in Acrylic HMPSA's Via Block Copolymer Technology," *Tappi Polymers, Laminations and Coatings Conference*, Sep. 5–8, 1989, pp. 679–683.

Rauwendaal, Chris (editor), "Mixing in Single–Screw Extruders," *Mixing in Polymer Processing*, 1991, pp. 129, 176–177 and 185–186.

Sanderson, F.T. and D.R. Gehman, "Acrylic Hot Melt Pressure Sensitive Adhesives: Emerging Technology for the 80's," *Tappi Hot Melt Short Course Notes*, Jun. 1–4, 1980, pp. 39–60.

Sparks, William J., "Advances in Hot Melt and Waterbone Acrylic PSAs," *Adhesives Age*, Mar. 1982, vol. 25, No. 3, pp. 38–44.

* cited by examiner

*Primary Examiner*—Peter Szekely
(74) *Attorney, Agent, or Firm*—Scott R. Pribnow

(57) ABSTRACT

A hot-melt adhesive composition comprises a blend of at least one acidic polymer and at least one basic polymer. At least one of the polymers is a hot-melt adhesive. Thermally reversible crosslinks are formed between each of the two polymers. These crosslinks impart cohesive strength to the applied adhesive, without sacrificing ease of processing.

24 Claims, No Drawings

HOT-MELT ADHESIVE COMPOSITIONS COMPRISING ACIDIC POLYMER AND BASIC POLYMER BLENDS

FIELD OF THE INVENTION

The present invention relates to hot-melt adhesive compositions. In particular, hot-melt adhesive blends and methods for their preparation and use are taught by the present invention.

BACKGROUND OF THE INVENTION

Adhesives are often characterized by the form in which they are provided for application. Traditionally, adhesives have been provided in organic solvent for subsequent application. Such adhesives are applied to a substrate and the solvent is then removed. Hot-melt adhesives advantageously reduce or eliminate the use of organic solvents in adhesives and their processing. Hot-melt adhesive systems are essentially 100% solid systems. Usually, such systems have no more than about 5% organic solvents or water, more typically no more than about 3% organic solvents or water. Most typically, such systems are free of organic solvents and water. Advantageously, by reducing the use of organic solvents, special handling concerns associated therewith are also reduced.

Among hot-melt adhesive chemistries, (meth)acrylates (i.e., methacrylates and acrylates) are one of the most prominent. (Meth)acrylates have evolved as a preferred class of adhesives due to their clarity, permanence of properties over time, and versatility of adhesion, to name just a few of the their benefits.

Hot-melt adhesives have a sufficient viscosity upon melting, such that they can be hot-melt processed (e.g., applied to a substrate). By adjusting the processing temperature, the viscosity of the adhesive can be readily tailored for application. For high performance applications (i.e., those requiring relatively strong cohesion, such as shear holding strength), some method of increasing the cohesive strength of applied hot-melt adhesives is often needed (e.g., post-crosslinking or moisture-curing).

For example, energy sources, such as electron beam (e-beam) or ultraviolet (UV) radiation, are commonly used to crosslink adhesives after application. These methods, however, often require an additional processing step and, thus, result in decreased processing efficiency. Furthermore, e-beam is not always desired because it is expensive and can cause damage to some backings when the adhesive is used in a tape. Similarly, UV-radiation has its limitations as a crosslinking energy source. For example, UV-radiation is often not able to be used effectively for crosslinking relatively thick adhesives due to the need for UV-radiation to penetrate throughout the entire thickness of the adhesive. As such, certain fillers and pigments can not be used in adhesives when UV-crosslinking is used because they potentially interfere with penetration of UV-radiation therethrough.

One way to improve cohesive strength of an adhesive is by chemical crosslinking. Such crosslinking involves chemically bridging at least two polymer chains together through bonds (e.g., covalent and ionic bonds). To promote ionic crosslinking, ionic crosslinking agents have been explored. To date, most ionic crosslinking agents include inorganic metal additives. Further detail of particular chemically crosslinked adhesives is provided below.

For example, Japanese Laid-Open Patent Application (Kokai) 54-88,938 to Toyo Ink Mfg. KK discloses a hot-melt adhesive composition comprising a copolymer of a carboxylic acid and a (meth)acrylate and a polymer of an amine compound having an ethylenically unsaturated bond. The amine compounds are used individually or in combination of two or more thereof in a polymer obtained by polymerizing the amine compounds. The amine compound may also be copolymerized with monomers in the carboxylic acid/(meth) acrylate copolymer. It is stated, however, that in this situation, the kind and composition of the amine compound must be carefully controlled so that the resulting copolymer can have both good adhesive strength and good cohesive strength. Furthermore, the production process is liable to be complicated.

Everaerts et al. (U.S. Pat. No. 5,612,136) disclose adhesives comprising a crosslinked copolymer of certain (meth) acrylate esters, certain nitrogen containing basic monomers copolymerizable therewith, optional copolymerizable acidic monomer, and crosslinker.

Lohmann (PCT Publication No. WO 96/05813) teaches preparation of a pressure-sensitive adhesive film having a pressure-sensitive adhesive polyacrylate copolymer with at least 3 mole-% of co-polymerized acrylic acid or methacrylic acid, a polymer containing a basic amino group, and a plasticizer. Exemplified pressure-sensitive adhesives are prepared using organic solvents and coated out of an organic solvent-ethanol.

Guerin et al. (U.S. Pat. No. 4,152,189) disclose polyacrylic hot-melt adhesives prepared by blending from 5 to 95 parts by weight of a first copolymer with from 5 to 95 parts by weight of a second copolymer. Each of the copolymers comprises 0.5 to 15 parts by weight of an ethylenically unsaturated amine, carboxylic acid or sulfonic acid or mixtures thereof.

Desired hot-melt adhesives are those that have the ability to be tailored for a myriad of diverse applications. It is also desired that such hot-melt adhesives are able to meet cohesive strength requirements of certain applications without compromising processing efficiency or tailorability.

SUMMARY OF THE INVENTION

Hot-melt adhesives of the present invention comprise a blend of at least one acidic polymer and at least one basic polymer. Preferably, at least one of the acidic polymer and the basic polymer has hot-melt adhesive properties. Preferably, at least one of the acidic polymer and the basic polymer is a copolymer. Thermally reversible chemical crosslinks allow the adhesive to be easily hot-melt processed, but provide improved cohesive strength to the hot-melt adhesive after its application and cooling.

The acidic polymer is derived from at least one acidic monomer. Preferably, the acidic monomer is selected from ethylenically unsaturated carboxylic acids, ethylenically unsaturated sulfonic acids, ethylenically unsaturated phosphonic acids, and mixtures thereof. Due to their availability, particularly preferred acidic monomers are the ethylenically unsaturated carboxylic acids. When even stronger acids are desired, particularly preferred acidic monomers include the ethylenically unsaturated sulfonic acids and ethylenically unsaturated phosphonic acids.

Preferably, the acidic polymer is a copolymer derived from at least one acidic monomer and at least one non-acidic copolymerizable monomer. In particular embodiments, such acidic copolymers have hot-melt adhesive properties (e.g., pressure-sensitive hot-melt adhesive properties or heat-activatable hot-melt adhesive properties). Other monomers can be copolymerized with the acidic monomers (e.g., basic monomers, vinyl monomers, and (meth)acrylate monomers) as long as the acidic copolymer retains its acidity (i.e., it can still be titrated with a base). More preferably, however, the copolymerizable monomers are essentially free of basic monomers (i.e., the copolymerizable monomers include about 5 wt. % or less of basic monomers, but most preferably, the copolymerizable monomers are free of basic monomers).

Most preferably, the acidic polymer is an acidic (meth) acrylate copolymer. In this embodiment, the acidic (meth) acrylate copolymer is derived from at least one acidic monomer and at least one (meth)acrylate monomer selected from the group consisting of monofunctional unsaturated (meth)acrylate esters of non-tertiary alkyl alcohols, and mixtures thereof, the alkyl groups of which comprise from about 1 to about 20 carbon atoms, preferably about 1 to about 18 carbon atoms, such as those of Formula (I):

Formula (I)

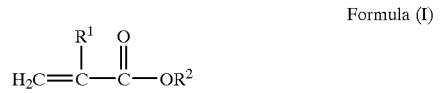

wherein $R^1$ is H or $CH_3$, the latter corresponding to where the (meth)acrylate monomer is a methacrylate monomer, and $R^2$ is a linear, branched, aromatic, or cyclic hydrocarbon group.

The basic polymer is derived from at least one basic monomer. Preferred basic monomers are non-nucleophilic amine-functional monomers, such as those of Formula (II):

Formula (II)

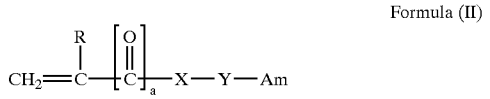

wherein
  a is 0 or 1;
  R is selected from H— and $CH_3$—,
  X is selected from —O— and —NH—;
  Y is a divalent linking group, preferably comprising about 1 to about 5 carbon atoms for ease of availability; and
  Am is a tertiary amine fragment, such as the group:

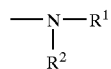

wherein $R^1$ and $R^2$ are selected from alkyl, aryl, cycloalkyl, and arenyl groups. $R^1$ and $R^2$ in the above group may also form a heterocycle. Alternatively, Am can be pyridinyl or imidazolyl, substituted or unsubstituted. In all embodiments, Y, $R^1$, and $R^2$ may also comprise heteroatoms, such as O, S, N, etc.

Exemplary basic monomers include N,N-dimethylaminopropyl methacrylamide (DMAPMAm); N,N-diethylaminopropyl methacrylamide (DEAPMAm); N,N-dimethylaminoethyl acrylate (DMAEA); N,N-diethylaminoethyl acrylate (DEAEA); N,N-dimethylaminopropyl acrylate (DMAPA); N,N-diethylaminopropyl acrylate (DEAPA); N,N-dimethylaminoethyl methacrylate (DMAEMA); N,N-diethylaminoethyl methacrylate (DEAEMA); N,N-dimethylaminoethyl acrylamide (DMAEAm); N,N-dimethylaminoethyl methacrylamide (DMAEMAm); N,N-diethylaminoethyl acrylamide (DEAEAm); N,N-diethylaminoethyl methacrylamide (DEAEMAm); N,N-dimethylaminoethyl vinyl ether (DMAEVE); N,N-diethylaminoethyl vinyl ether (DEAEVE); and mixtures thereof. Other useful basic monomers include vinylpyridine, vinylimidazole, tertiary amino-functionalized styrene (e.g., 4-(N,N-dimethylamino)-styrene (DMAS), 4-(N,N-dimethylamino)-styrene (DEAS)), and mixtures thereof.

Preferably, the basic polymer is a copolymer derived from at least one basic monomer and at least one non-basic copolymerizable monomer. In particular embodiments, such basic copolymers have hot-melt adhesive properties (e.g., pressure-sensitive hot-melt adhesive properties or heat-activatable hot-melt adhesive properties). Other monomers can be copolymerized with the basic monomers (e.g., acidic monomers, vinyl monomers, and (meth)acrylate monomers), as long as the basic copolymer retains its basicity (i.e., it can still be titrated with an acid). Most preferably, however, the copolymerizable monomers are essentially free of acidic monomers (i.e., the copolymerizable monomers include about 5 wt. % or less of acidic monomers, but most preferably, the copolymerizable monomers are free of acidic monomers).

Preferably, the basic copolymer is a basic (meth)acrylate copolymer. In this embodiment, the basic (meth)acrylate copolymer is derived from at least one monomer of Formula I.

In one embodiment, the hot-melt adhesive composition comprises a blend of:
  an acidic copolymer derived from a first group of monomers comprising at least one acidic monomer; and
  a basic copolymer derived from a second group of monomers comprising at least one basic monomer,
wherein at least one of the first and second group of monomers comprises greater than about 15% by weight of acidic or basic monomers, respectively. That is, the acidic copolymer is derived from at least 15% by weight of acidic monomers and/or the basic copolymer is derived from at least 15% by weight of basic monomers, based on total weight of the respective monomers. Preferably, at least one of the first and second group of monomers comprises at least about 25% by weight, more preferably at least about 35% by weight, even more preferably at least about 50% by weight, and most preferably at least about 60% by weight of the respective acidic or basic monomers. Preferably, each of the acidic copolymer and the basic copolymer is derived from monomers comprising at least one (meth)acrylate monomer, most preferably an alkyl (meth)acrylate monomer. Although more may be used, in certain embodiments, one of the acidic copolymer and the basic copolymer advantageously need only comprise up to about 5% by weight of the blend, typically about 0.5% by weight to about 5% by weight of the blend.

In another embodiment, the hot-melt adhesive composition comprises a blend of:
  an acidic homopolymer; and
  a basic copolymer derived from a group of monomers comprising at least one basic monomer.
In certain variations of this embodiment, the group of monomers comprises at least about 15% by weight of basic monomers; although, lower amounts may also be used. Advantageously, although more may be used, the acidic homopolymer need only comprise as little as up to about 5% by weight of the blend, most typically about 0.5% by weight to about 5% by weight of the blend, in order to achieve hot-melt adhesives having cohesive strengths suitable for intended applications.

In yet another embodiment, the hot-melt adhesive composition comprises a blend of:

an acidic copolymer derived from monomers comprising at least one monomer selected from the group consisting of an ethylenically unsaturated sulfonic acid, an ethylenically unsaturated phosphonic acid, and mixtures thereof and at least one non-acidic copolymerizable monomer; and a basic homopolymer.

In certain variations of this embodiment, the monomers, from which the acidic copolymer is derived, comprise at least about 15% by weight of acidic monomers; although, lower amounts may also be used. Advantageously, although more may be used, the basic homopolymer need only comprise as little as up to about 5% by weight of the blend in certain variations of this embodiment, most typically about 0.5% by weight to about 5% by weight of the blend, in order to achieve hot-melt adhesives having cohesive strengths suitable for intended applications.

Further embodiments of the invention include substrates and tapes (e.g., single-sided and double-sided tapes) comprising the hot-melt adhesive compositions. Also disclosed are methods for preparing and using the hot-melt adhesive compositions. For example, in one embodiment, a method for improving cohesive strength of a hot-melt adhesive comprises the steps of:

providing a basic hot-melt adhesive (i.e., one that can be titrated with an acid); and blending an acidic copolymer with the hot-melt adhesive, wherein the acidic copolymer is derived from monomers comprising at least about 15% by weight of acidic monomers. In another embodiment, a method for improving cohesive strength of a hot-melt adhesive comprises the steps of:

providing an acidic hot-melt adhesive (i.e., one that can be titrated with a base); and blending a basic copolymer with the hot-melt adhesive, wherein the basic copolymer is derived from monomers comprising at least about 15% by weight of basic monomers. The methods may also further comprise the step of applying the hot-melt adhesive to a substrate.

By utilizing polymeric blends of the present invention, hot-melt adhesives advantageously have one or more of the following characteristics: increased cohesive strength, miscibility between the polymers in the blends is promoted, variability in form (e.g., pellet form versus pumpable form) in which the polymers can be introduced into a hot-melt adhesive, greater formulation latitude, a balance between peel adhesion and cohesive strength, more efficient and uniform thermally reversible crosslinking, and cost-effectiveness.

DETAILED DESCRIPTION OF THE PREFERRED EMBODIMENTS

Hot-melt adhesives of the present invention are "thermally reversibly crosslinked." That is, the adhesives of the present invention remain hot-melt processable after application and cooling, yet retain characteristics of a crosslinked adhesive (e.g., solvent and/or creep resistance). Thus, the adhesives may be repeatedly hot-melt processed, while still providing adhesives with improved cohesive strength.

A primary advantage of the present blends is that they have improved cohesive strength after application without the need for subsequent curing steps. Additional curing steps may be utilized, however, if so desired. Such additional curing steps include exposing the adhesive to radiation, such as ultraviolet or electron beam radiation.

Hot-melt adhesives of the present invention comprise a blend of at least one acidic polymer and at least one basic polymer. Preferably, at least one of the acidic polymer and the basic polymer is a hot-melt adhesive (i.e., having properties of a hot-melt adhesive). The following description of such hot-melt adhesive blends and their use will make reference to terms which are hereinafter defined as follows:

"Pressure-sensitive adhesives (PSAs)" are well known to one of ordinary skill in the art to possess properties including the following: (1) aggressive and permanent tack, (2) adherence with no more than finger pressure, (3) sufficient ability to hold onto an adherend, and (4) sufficient cohesive strength to be removed cleanly from the adherend. PSAs are one example of a preferred hot-melt adhesive blend in accordance with the present invention.

"Heat-activatable adhesive systems" are another preferred hot-melt adhesive blend in accordance with the present invention. Heat-activatable adhesives are substantially non-tacky at room temperature, but become tacky upon heating. Heat-activatable systems, unlike PSA systems, rely on a combination of pressure and heat to bond to a surface.

"Acidic monomers" are those monomers that can be titrated with a base.

"Basic monomers" are those monomers that can be titrated with an acid.

"Polymer" refers to macromolecular materials having at least five repeating monomeric units, which may or may not be the same. The term polymer, as used herein, encompasses homopolymers and copolymers.

An "acidic copolymer" is a polymer that is derived from at least one acidic monomer and at least one non-acidic copolymerizable monomer (i.e., a monomer that can not be titrated with a base). In a preferred embodiment, at least one copolymerizable monomer is a (meth)acrylate monomer (e.g., an alkyl (meth)acrylate monomer). The acidic copolymer may optionally be derived from other copolymerizable monomers, such as vinyl monomers and basic monomers, as long as the copolymer can still be titrated with a base. Thus, usually more acidic monomers are utilized to prepare the acidic copolymers than basic monomers. Preferably, however, in order to efficiently impart cohesive strength to the adhesive, essentially no basic monomers (i.e., the copolymerizable monomers include about 5 wt. % or less of basic monomers, but most preferably, the copolymerizable monomers are free of basic monomers) are utilized to prepare the acidic copolymers of the present invention.

A "basic copolymer" is a polymer that is derived from at least one basic monomer and at least one non-basic copolymerizable monomer (i.e., a monomer that can not be titrated with an acid). In a preferred embodiment, at least one copolymerizable monomer is a (meth)acrylate monomer (e.g., an alkyl (meth)acrylate monomer). The basic copolymer may optionally be derived from other copolymerizable monomers, such as vinyl monomers and acidic monomers, as long as the copolymer can still be titrated with an acid. Thus, it is preferred that more basic monomers are utilized to prepare the basic copolymers than are acidic monomers. Most preferably, however, in order to efficiently impart cohesive strength to the adhesive, essentially no acidic monomers (i.e., the copolymerizable monomers include about 5 wt. % or less of acidic monomers, but most preferably, the copolymerizable monomers are free of acidic monomers) are utilized to prepare basic copolymers of the present invention.

An "acidic homopolymer" is a polymer that is derived solely from acidic monomers. The acidic monomers may be the same or different, so long as they are copolymerizable. Preferably, all of the acidic monomers are the same.

A "basic homopolymer" is a polymer that is derived solely from basic monomers. The basic monomers may be the same or different, so long as they are copolymerizable. Preferably, all of the basic monomers are the same.

Acidic Monomers

Useful acidic monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl acrylate, 2-sulfoethyl methacrylate, styrene sulfonic acid, 2-acrylamido-2-methylpropane sulfonic acid, vinyl phosphonic acid, and the like, and mixtures thereof Due to their availability, particularly preferred acidic monomers are the ethylenically unsaturated carboxylic acids. When even stronger acids are desired, particularly preferred acidic monomers include the ethylenically unsaturated sulfonic acids and ethylenically unsaturated phosphonic acids. Sulfonic and phosphonic acids generally provide a stronger interaction with the basic polymer. This stronger interaction can lead to greater improvements in cohesive strength, as well as higher temperature resistance and solvent resistance of the hot-melt adhesive.

When the acidic polymer is a copolymer, the ratio of acidic monomers to non-acidic copolymerizable monomers utilized varies depending on desired properties of the resulting hot-melt adhesive. The properties of the hot-melt adhesive can also be adjusted by varying the amount of the acidic copolymer in the blend.

Generally, as the proportion of acidic monomers used in preparing the acidic copolymer increases, cohesive strength of the resulting adhesive increases. The proportion of acidic monomers is usually adjusted depending on the proportion of acidic copolymer present in the blends of the present invention. Preferably, the proportion of acidic monomers is less than about 15% by weight when the acidic copolymer is a pressure sensitive hot-melt adhesive. In other embodiments, the proportion of acidic monomers is preferably greater than about 15% by weight, especially when the basic polymer is a copolymer derived from less than about 15% by weight of basic monomers. More preferably, in such embodiments, the proportion of acidic monomers is at least about 25% by weight. Even more preferably, in such embodiments, the proportion of acidic monomers is at least about 35% by weight. In certain embodiments, preferably, the proportion of acidic monomers is at least about 50% by weight. More preferably, for certain embodiments, the proportion of acidic monomers is at least about 60% by weight.

Basic Monomers

A wide variety of basic monomers are useful in the present invention. Preferably, the basic monomer is a non-nucleophilic (i.e., having no hydrogen atoms directly bonded to nitrogen atoms) amine-functional monomer. A preferred basic copolymerizable monomer is represented by Formula (II).

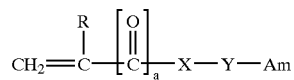

Formula (II)

wherein a is 0 or 1; R is selected from H— and $CH_3$—, X is selected from —O— and —NH—; and Y is a divalent linking group, preferably comprising about 1 to about 5 carbon atoms for ease of availability. Examples of specific Y groups include those selected from the groups consisting of —$(CH_2)_n$—, wherein n represents an integer of 1 to 5, and divalent alkyl groups having internal linkages selected from ether linking groups, thioether linking groups, keto linking groups, urea linking groups, urethane linking groups, amido linking groups, combinations thereof, and the like.

Am is a tertiary amine fragment, such as the group:

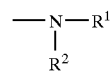

wherein $R^1$ and $R^2$ are independently selected from an alkyl group, an aryl group, a cycloalkyl group, and an arenyl group. $R^1$ and $R^2$ in the above group may also form a heterocycle. Am can, alternatively, comprise a monovalent aromatic radical comprising 1 to 3 aromatic ring structures, preferably 1, wherein at least 1 aromatic ring structure contains a basic nitrogen atom as a member of the ring structure itself, such as pyridinyl and substituted pyridinyl. Am can also comprise other basic heterocycles, such as imidazole or substituted imidazole. In all embodiments, Y, $R^1$, and $R^2$ may also comprise heteroatoms, such as O, S, N, etc.

The basicity of the monomers utilized in the present invention is defined by their substitution. $R^1$ and/or $R^2$ may in certain situations represent an electron-donating group. Such substituents that increase the electron density on a nitrogen by field effects (or resonance in the case of aromatic bases such as pyridine) will increase the basicity of the nitrogen. Alkyl groups are preferred for inclusion in $R^1$ and $R^2$ due to their electron-donating nature. Examples of electron-donating groups that $R^1$ and/or $R^2$ can comprise include, but are not limited to, those selected from —$C(R^3)_3$, —$CH(^3)_2$, —$CH_2(R^3)$, and —$CH_3$, wherein $R^3$ represents an alkyl group, typically an alkyl group comprising about 1 carbon atom to about 6 carbon atoms. Most preferably, $R^1$ and $R^2$ are linear, alkyl groups. The higher the degree of substitution on the nitrogen by such alkyl groups, the higher the basicity of the monomer.

Conversely, substituents which decrease the electron density on the nitrogen of a basic copolymerizable monomer, such as a phenyl group, will reduce the basicity of the monomer. Preferably, R1 and $R^2$ do not contain electron-withdrawing atoms (e.g., halogens, —COOH, —$NO_2$, etc.) directly connected to the nitrogen within the amine-functional monomer. However, electron-withdrawing atoms separated from the nitrogen atom by, for example, an alkane structure, are suitable for inclusion in the group Am.

A wide variety of basic monomers of Formula II can be utilized for such copolymers. For example, N,N-dimethylaminopropyl methacrylamide (DMAPMAm); N,N-diethylaminopropyl methacrylamide (DEAPMAm); N,N-dimethylaminoethyl acrylate (DMAEA); N,N-diethylaminoethyl acrylate (DEAEA); N,N-dimethylaminopropyl acrylate (DMAPA); N,N-diethylaminopropyl acrylate (DEAPA); N,N- dimethylaminoethyl methacrylate (DMAEMA); N,N-diethylaminoethyl methacrylate (DEAEMA); N,N-dimethylaminoethyl acrylamide (DMAEAm); N,N-dimethylaminoethyl methacrylamide (DMAEMAm); N,N-diethylaminoethyl acrylamide (DEAEAm); N,N-diethylaminoethyl methacrylamide (DEAEMAm); N,N-dimethylaminoethyl vinyl ether (DMAEVE); N,N-diethylaminoethyl vinyl ether (DEAEVE); and mixtures thereof are useful basic monomers. Other basic monomers that can be used include 4-(N,N-dimethylamino)-styrene (DMAS); 4-(N,N-diethylamino)-styrene (DEAS); vinylpyridine; vinylimidazole; and mixtures thereof Many of these monomers are commercially available from Rohm Tech, Inc., of Maiden, Mass.; CPS Chemical Co., Inc., of Old Bridge, N.J.; Rohm & Haas, of Philadelphia, Pa.; and/or Aldrich Chemical Co., Inc., of Milwaukee, Wis.

When the basic polymer is a copolymer, the ratio of basic monomers to non-basic copolymerizable monomers utilized varies depending on desired properties of the resulting hot-melt adhesive. The properties of the hot-melt adhesive can also be adjusted by varying the amount of the basic copolymer in the blend.

Generally, as the proportion of basic monomers used in preparing the basic copolymer increases, cohesive strength of the resulting adhesive increases. The proportion of basic monomers is usually adjusted depending on the proportion of basic copolymer present in the blends of the present invention. Preferably, the proportion of basic monomers is less than about 15% by weight when the basic copolymer is a pressure sensitive hot-melt adhesive. In other embodiments, the proportion of basic monomers is preferably greater than about 15% by weight, especially when the acidic polymer is a copolymer derived from less than about 15% by weight of acidic monomers. In such embodiments, more preferably, the proportion of basic monomers is at least about 25% by weight. Even more preferably, the proportion of basic monomers is at least about 35% by weight. In certain embodiments, preferably, the proportion of basic monomers is at least about 50% by weight. More preferably, for certain embodiments, the proportion of basic monomers is at least about 60% by weight.

Optional Vinyl Monomers

When used, vinyl monomers useful in the acidic and basic copolymers include N-vinyl pyrrolidone, N-vinyl caprolactam, acrylonitrile, N-vinyl formamide, vinyl esters (e.g., vinyl acetate), (meth)acrylamide, styrene, substituted styrene (e.g., α-methyl styrene), vinyl toluene, vinyl chloride, vinyl propionate, and mixtures thereof.

When the acidic polymer and/or the basic polymer is a copolymer, it is preferred that at least one of the copolymers is a (meth)acrylate copolymer. Most preferably, each of the copolymers is a (meth)acrylate copolymer. Accordingly, each (meth)acrylate copolymer is preferably derived from at least one (meth)acrylate monomer.

(Meth)acrylate Monomers (Meth)acrylate copolymers useful in the invention contain at least one monofunctional unsaturated monomer selected from the group consisting of (meth)acrylate esters of non-tertiary alkyl alcohols, the alkyl groups of which comprise from about 1 to about 20, preferably about 1 to about 18 carbon atoms; and mixtures thereof. Preferred (meth)acrylate monomers have the following general Formula (I):

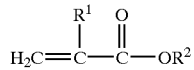

Formula (I)

wherein $R^1$ is H or $CH_3$, the latter corresponding to where the (meth)acrylate monomer is a methacrylate monomer. $R^2$ is broadly selected from linear, branched, aromatic, or cyclic hydrocarbon groups. Preferably, $R^2$ is a linear or branched hydrocarbon group. The number of carbon atoms in the hydrocarbon group is preferably about 1 to about 20, and more preferably about 1 to about 18. When $R^2$ is a hydrocarbon group, it can also include heteroatoms (e.g., oxygen or sulfur).

Criteria to consider when selecting $R^2$ include cost and the form in which the copolymer will be incorporated into the hot-melt adhesive. The manner of blending the components of the hot-melt adhesive varies. For example, each component can be incorporated into the hot-melt adhesive in a wide variety of forms, such as a pumpable form or a pelleted form. When incorporating a pumpable form of a copolymer into the hot-melt adhesive, a wide variety of (meth)acrylate copolymers can be used.

When incorporating a pelleted form of a copolymer into the hot-melt adhesive, the glass transition temperature (Tg) of the (meth)acrylate copolymer is controlled, preferably such that the copolymer is not tacky and free of blocking (i.e., such that pellets do not stick together, especially when under pressure). Thus, copolymers having a Tg of at least room temperature (i.e., 22° C. to 25° C.) and more preferably a Tg of greater than about 50° C. are preferred. $R^2$ is, thus, selected accordingly. Alternatively, monomers having a crystalline melting point (Tm) can be used to make pelleted copolymers. When used in proportions such that the resulting copolymer has a Tm of greater than the storage temperature, storage-stable pellets can be obtained. For ease of storage, preferably such pelleted copolymers have a Tm of at least about 50° C. However, the Tm should be below the desired melt processing temperature to facilitate incorporating the pellets into a blend.

Examples of suitable (meth)acrylate monomers useful in the present invention include, but are not limited to, benzyl methacrylate, n-butyl acrylate, n-butyl methacrylate, cyclohexyl acrylate, cyclohexyl methacrylate, decyl acrylate, 2-ethoxy ethyl acrylate, 2-ethoxy ethyl methacrylate, ethyl acrylate, 2-ethylhexyl acrylate, ethyl methacrylate, n-hexadecyl acrylate, n-hexadecyl methacrylate, hexyl acrylate, isoamyl acrylate, isobomyl acrylate, isobornyl methacrylate, isobutyl acrylate, isodecyl acrylate, isodecyl methacrylate, isononyl acrylate, isooctyl acrylate, isooctyl methacrylate, isotridecyl acrylate, lauryl acrylate, lauryl methacrylate, 2-methoxy ethyl acrylate, methyl acrylate, methyl methacrylate, 2-methyl butyl acrylate, 4-methyl-2-pentyl acrylate, 1-methylcyclohexyl metbacrylate, 2-methylcyclohexyl methacrylate, 3-methylcyclohexyl methacrylate, 4-methylcyclohexyl methacrylate, octadecyl acrylate, octadecyl methacrylate, n-octyl acrylate, n-octyl methacrylate, 2-phenoxy ethyl methacrylate, propyl acrylate, n-tetradecyl acrylate, n-tetradecyl methacrylate, and mixtures thereof Particularly preferred are the alkyl (meth)acrylate monomers.

The amounts and types of monomers used in preparing the acidic and basic copolymers of the present invention can be varied to provide a range of adhesive properties desired for the end use. Higher crosslinking density and cohesive strength can be obtained by increasing amounts of copolymerizable basic or acidic monomer utilized in preparing copolymers of the present invention, while lowering the amounts of the copolymerizable basic or acidic monomer can reduce the crosslinking density within the blend. If one or both of the acidic polymer and the basic polymer are copolymers, then it is preferred that at least one of the copolymers is derived from monomers comprising greater than about 15% by weight of acidic or basic monomers, respectively, so as to provide sufficiently improved cohesive strength. More preferably, at least one of the copolymers is derived from monomers comprising at least about 25% by weight; even more preferably, at least about 35% by weight; yet even more preferably, at least about 50% by weight; and most preferably, at least about 60% by weight of acidic or basic monomers, respectively.

If one of the acidic or basic polymer requires pressure-sensitive adhesive characteristics, then a corresponding copolymer can be tailored to have a resultant glass transition temperature (Tg) of less than about 0° C. Particularly preferred pressure-sensitive adhesive copolymers are (meth) acrylate copolymers. Such copolymers typically are derived from monomers comprising about 40% by weight to about 98% by weight, preferably at least 70% by weight, more preferably at least 85% by weight, most preferably about 90% by weight, of at least one alkyl (meth)acrylate monomer that, as a homopolymer, has a Tg of less than about 0° C. Basic (meth)acrylate copolymers typically are derived from monomers comprising about 2% by weight to about 60% by weight, preferably about 10% by weight to about 40% by weight, of a copolymerizable basic monomer. Acidic (meth)acrylate copolymers typically are derived from monomers comprising about 2% by weight to about 30% by weight, preferably about 2% by weight to about 15% by weight, of a copolymerizable acidic monomer. Examples of such alkyl (meth)acrylate monomers are those in which the alkyl groups comprise from about 4 carbon atoms to about 12 carbon atoms and include, but are not limited to, n-butyl acrylate, 2-ethylhexyl acrylate, isooctyl acrylate, isononyl acrylate, isodecyl acrylate, and mixtures thereof Optionally, other vinyl monomers and alkyl (meth) acrylate monomers which, as homopolymers, have a Tg greater than 0C., such as methyl acrylate, methyl methacrylate, ethyl acrylate, isobornyl acrylate, vinyl acetate, styrene, and the like, may be utilized in conjunction with one or more if the alkyl (meth)acrylate monomers and copolymerizable basic or acidic monomers, provided that the Tg of the resultant (meth)acrylate copolymer is less than about 0° C.

Heat-activatable adhesives can be obtained by preparing copolymers from the same components used to form the pressure-sensitive adhesive copolymers discussed above. Preferably, the heat-activatable adhesives are prepared from (meth)acrylate monomers. The low Tg alkyl (meth)acrylate monomers (i.e., those that, as a homopolymer, have a Tg of less than about 0° C.), copolymerizable basic or acidic monomers, optional vinyl monomers, and high Tg alkyl (meth)acrylate monomers (i.e., those that as a homopolymer, have a Tg of greater than about 0° C.) are used in different proportions, however, such that the final (meth)acrylate copolymer has a Tg of about 25° C. to about 30° C. below the desired heat-activation temperature. To increase the copolymer Tg, higher levels of the basic monomer, acidic monomer, and/or higher levels of the high Tg alkyl (meth) acrylate monomer can be used. The proportion of the high Tg monomers is dictated by the final Tg requirement.

Cohesive strength of the resulting hot-melt adhesive blends is preferably at least greater than the cohesive strength of the individual polymeric components (e.g., the hot-melt adhesive). The final cohesive strength depends, however, on the amount and type of each polymer present in the hot-melt adhesive, as well as other components (e.g., tackifiers, plasticizers, etc.) of the hot-melt adhesive system. The shear strength of an adhesive is related to its cohesive strength. An improvement in shear strength of hot-melt adhesives is one advantage of utilizing the present blends.

Advantageously, increased cohesive strength can be achieved without an additional curing step. However, other types of curing (i.e., thermal, ultraviolet or electron beam radiation) can also be used in conjunction with the present hot-melt adhesive blends. Generally, however, they are not necessary.

Other advantages of utilizing blends of the present invention include the ability to provide thick adhesive coatings with sufficient crosslinking throughout the thickness. Previously, this was often difficult and problematic when utilizing photoactivated crosslinking agents because it was difficult for UV-radiation to penetrate the entire thickness of certain adhesive coatings.

In the most preferred embodiment, the hot-melt adhesive blend comprises at least one acidic (meth)acrylate copolymer and at least one basic (meth)acrylate copolymer. By utilizing (meth)acrylate copolymer blends for the hot-melt adhesives, many advantages are obtained. Although blends of at least two copolymers are preferred, however, some of these advantages can also be obtained when only one of the polymers is a copolymer.

For example, miscibility between the two copolymers is promoted because both copolymers are (meth)acrylate copolymers. Miscibility is reflected by the coatibility of the hot-melt adhesive blend (i.e., the adhesives can be readily coated using conventional techniques without significant detrimental defects, such as streaks, particles, or a grainy texture, etc.). As used herein, miscibility does not mean that optically clear blends have to be obtained or that the components are miscible on a molecular scale. Advantageously, miscibility can be achieved at relatively lower temperatures, enabling the hot-melt adhesives to be potentially applied to a substrate at lower temperatures. Due to the increased miscibility of the adhesive components, organic solvents or water are not required when blending or coating the hot-melt adhesive system. Thus, the present blends are particularly well suited for use in hot-melt adhesive systems—systems that are essentially 100% solids systems. Preferably, such systems have no more than about 5% organic solvents or water, more preferably no more than about 3% organic solvents or water. Most preferably, such systems are free of organic solvents and water.

Also, the use of copolymers allows for variability in form (e.g., pellet form versus pumpable form) in which the polymers can be introduced into the hot-melt adhesive. This is advantageous because it allows for variability to meet operator needs (e.g., compatibility with a wide variety of equipment).

Another advantage that blends, especially copolymers blends, provide is greater formulation latitude. That is, changes in the degree of crosslinking can be effectuated, for example, by varying the ratio of individual components in the blends. By utilizing copolymers, the proportion of the acidic and basic monomers is diluted by the presence of the copolymerizable monomers (e.g., (meth)acrylate monomers). Thus, small changes in crosslinking density can be accomplished without as much precision in measurement, allowing for more formulation latitude. It should also be noted that oftentimes equipment utilized in such processes is not available for measuring components to an acceptable degree of accuracy, as required when utilizing, for example, homopolymers or low molecular weight crosslinking additives in the blends.

Changes in the degree of crosslinking can also be effectuated by tailoring the distance between crosslinks in an adhesive. For example, by varying the proportion of acidic and basic monomers used in preparing the copolymers, the degree of crosslinking can be affected. In this manner, a balance between peel adhesion and cohesive strength can be readily achieved in the hot-melt adhesive.

Yet another advantage of utilizing copolymer blends is that more efficient and uniform crosslinking can occur, as compared to, for example, when one copolymer is blended with a homopolymer. These attributes are believed to be a result of the blending capabilities of the copolymers. Homopolymers do not blend as well because acid/base interactions at the point of addition are stronger due to the higher proportion (i.e., 100%) of acidic or basic monomers in the homopolymer. This strong interaction often prevents the homopolymer from diffusing efficiently and uniformly through the hot-melt adhesive. In contrast, the proportion of acidic/basic monomers in the copolymers is diluted due to the copolymerization of other monomers (e.g., (meth) acrylate monomers) therewith. This moderates such strong acid/base interactions at the point of addition, thus, facilitating mixing of the polymeric components.

Finally, cost effectiveness is another advantage of utilizing copolymers in the blends. For example, less expensive (meth)acrylate monomers can be utilized in one of the copolymers. In that way, less expensive (meth)acrylate monomers can act as an "extender" for more expensive (meth)acrylate monomers contained in the other copolymer. Similarly, the (meth)acrylate monomers can act as an "extender" for more expensive basic or acidic monomers. Furthermore, the added cost of ultraviolet or electron beam radiation equipment is not necessary when utilizing the present hot-melt blends because such post-polymerization processing is not necessary to achieve desired cohesive strengths.

Polymerization Methods

The polymers herein can be prepared by any conventional free radical polymerization method, including solution, radiation, bulk, dispersion, emulsion, and suspension processes.

In one solution polymerization method, the monomers, along with a suitable inert organic solvent, are charged into a four-neck reaction vessel that is equipped with a stirrer, a thermometer, a condenser, an addition funnel, and a thermowatch. A concentrated thermal free radical initiator solution is added to the addition funnel. The whole reaction vessel, addition funnel, and their contents are then purged with nitrogen to create an inert atmosphere. Once purged, the solution within the vessel is heated to an appropriate temperature to activate the free radical initiator to be added, the initiator is added, and the mixture is stirred during the course of the reaction. A 98% to 99% conversion should be obtained in about 20 hours.

Another polymerization method is ultraviolet (UV) radiation-initiated photopolymerization of the monomer mixture. After pre-polymerization to a coatable viscosity, the mixture, along with a suitable photoinitiator, is coated onto a flexible carrier web and polymerized in a sufficiently inert (i.e., essentially oxygen free) atmosphere (e.g., a nitrogen atmosphere). A sufficiently inert atmosphere can be achieved by covering a layer of the photoactive coating with a plastic film that is substantially transparent to ultraviolet radiation and irradiating through the plastic film in air using low intensity, fluorescent-type ultraviolet lamps that generally give a total radiation dose of about 500 milliJoules/cm$^2$.

Bulk polymerization methods, such as the continuous free radical polymerization method described by Kotnour et al. in U.S. Pat. Nos. 4,619,979 and 4,843,134; the essentially adiabatic polymerization methods using a batch reactor described by Ellis in U.S. Pat. No. 5,637,646; suspension polymerization processes described by Young et al. in U.S. Pat. No. 4,833,179; and, the methods described for polymerizing packaged pre-adhesive compositions described by Hamer et al. in PCT Publication No. WO 97/33945 may also be utilized to prepare the polymers.

Suitable thermal free radical initiators which may be utilized include, but are not limited to, those selected from azo compounds, such as 2,2'-azobis(isobutyronitrile); hydroperoxides, such as tert-butyl hydroperoxide; and, peroxides, such as benzoyl peroxide and cyclohexanone peroxide. Photoinitiators which are useful according to the invention include, but are not limited to, those selected from benzoin ethers, such as benzoin methyl ether or benzoin isopropyl ether; substituted benzoin ethers, such as anisole methyl ether; substituted acetophenones, such as 2,2-diethoxyacetophenone and 2,2-dimethoxy-2-phenyl acetophenone; substituted alpha-ketols, such as 2-methyl-2-hydroxy propiophenone; aromatic sulfonyl chlorides, such as 2-naphthalene sulfonyl chloride; and, photoactive oximes, such as 1-phenyl-1,2-propanedione-2-(ethoxycarbonyl)oxime. For both thermal- and radiation-induced polymerizations, the initiator is present in an amount of about 0.05 percent to about 5.0 percent by weight based upon the total weight of the monomers.

Preferably, the polymers are polymerized without solvent. Yet, suitable inert organic solvent, if desired, may be any organic liquid which is sufficiently inert to the reactants and product such that it will not otherwise adversely affect the reaction. Such solvents include ethyl acetate, acetone, methyl ethyl ketones, and mixtures thereof If used, the amount of solvent is generally about 30–80% by weight based on the total weight of the reactants (monomer and initiator) and solvent. In such cases, the solvent is generally removed from the polymers prior to blending.

Chain transfer agents can also be utilized when polymerizing the polymers described herein to control the molecular weight of the polymers. Suitable chain transfer agents include halogenated hydrocarbons (e.g., carbon tetrabromide) and sulfur compounds (e.g., lauryl mercaptan, butyl mercaptan, ethanethiol, and 2-mercaptoether).

The amount of chain transfer agent that is useful depends upon the desired molecular weight and the type of chain transfer agent. Organic solvents (e.g., toluene, isopropanol, and ethyl acetate) can also be used as chain transfer agents, but they generally are not as active as, for example, sulfur compounds. The chain transfer agent is typically used in amounts from about 0.001 parts to about 10 parts; preferably, 0.01 to about 0.5 parts; and most preferably from about 0.02 parts to about 0.20 parts based on total weight of the monomers.

Blending

Blending of the polymers is done by any method that results in a substantially homogenous distribution of the acidic polymer and the basic polymer. The polymers can be blended using several methods. For example, the polymers can be blended in-situ by sequential polymerization.

Alternatively, the polymers can be blended by melt blending, solvent blending, or any suitable physical means.

For example, the polymers can be melt blended by a method as described by Guerin et al. in U.S. Pat. No. 4,152,189. That is, all solvent (if used) is removed from each polymer by heating to a temperature of about 150° C. to about 175° C. at a pressure of about 5 Torr to about 10 Torr. Then, the polymers are weighed into a vessel in the desired proportions. The blend is then formed by heating the contents of the vessel to about 175° C., while stirring.

Although melt blending is preferred, the adhesive blends of the present invention can also be processed using solvent blending. The acidic and basic polymers should be substantially soluble in the solvents used.

Physical blending devices that provide dispersive mixing, distributive mixing, or a combination of dispersive and distributive mixing are useful in preparing homogenous blends. Both batch and continuous methods of physical blending can is be used. Examples of batch methods include BRABENDER (using a BRABENDER PREP CENTER, available from C.W. Brabender Instruments, Inc.; South Hackensack, N.J.) or BANBURY internal mixing and roll milling (using equipment available from FARREL COMPANY; Ansonia, Conn.). Examples of continuous methods include single screw extruding, twin screw extruding, disk extruding, reciprocating single screw extruding, and pin barrel single screw extruding. The continuous methods can include utilizing both distributive elements, such as cavity transfer elements (e.g., CTM, available from RAPRA Technology, Ltd.; Shrewsbury, England) and pin mixing elements, static mixing elements and dispersive elements (e.g., MADDOCK mixing elements or SAXTON mixing elements as described in "Mixing in Single-Screw Extruders," *Mixing in Polymer Processing*, edited by Chris Rauwendaal (Marcel Dekker Inc.: New York (1991), pp. 129, 176–177, and 185–186).

Due to the sometimes strong acid/base interaction between the acidic polymer and basic polymer of the adhesive blend, homogenous distribution of the polymers may be difficult. Thus, to assist in blending, it may be preferable to add a neutralizing agent to temporarily neutralize acidic functional groups of the acidic polymer, basic functional groups of the basic polymer, or both. After blending, the neutralizing agent can be evaporated, regenerating acid/base interactions between the polymers. Examples of neutralizing agents for basic functional groups include volatile organic acids, such as formic acid and acetic acid. Useful neutralizing agents for acidic functional groups include volatile organic bases, such as ammonia, trimethyl amine, and triethylamine.

Preferably, one of the polymers has adhesive properties (e.g., pressure-sensitive adhesive or heat-activated adhesive properties) and constitutes a major proportion of the blend. The other polymer then constitutes a minor proportion of the blend and is adjusted to achieve desired properties of the resulting adhesive. Although, more may be used, only small amounts of the minor component are needed for effectiveness in certain embodiments. Preferably about 0.5% by weight to about 15% by weight more preferably about 1% by weight to about 10% by weight, and most preferably about 1% by weight to about 5% by weight of the minor component based on total weight of the polymeric components is used in the blend.

Other Additives

Other additives may also be blended into the hot-melt adhesive prior to application thereof, depending on the desired properties of the applied adhesive. For example, if a pressure-sensitive hot-melt adhesive is desired, tackifiers can be added if the crosslinking density causes a substantial decrease in the amount of tack below that which is desired. Plasticizers can also be added.

Photoinitiators and photocrosslinkers can be added for optional subsequent curing by UV-irradiation. Although not present in the preferred embodiments, conventional crosslinking agents (both physical and chemical crosslinking agents) can also be utilized in all embodiments of the present blends.

Application of the Hot-Melt Adhesive

The hot-melt adhesive is readily applied to a substrate. For example, the hot-melt adhesive can be applied to sheeting products (e.g., decorative, reflective, and graphical), labelstock, and tape backings. The substrate can be any suitable type of material depending on the desired application. Typically, the substrate comprises a nonwoven, paper, polypropylene (e.g., biaxially oriented polypropylene (BOPP)), polyethylene, polyester (e.g., polyethylene terephthalate), or release liner (e.g., siliconized liner).

Thus, hot-melt adhesives according to the present invention can be utilized to form tape, for example. To form a tape, the hot-melt adhesive is coated onto at least a portion of a suitable backing. A release material (e.g., low adhesion backsize) can be applied to the opposite side of the backing, if desired. When double-sided tapes are formed, the hot-melt adhesive is coated onto at least a portion of both sides of the backing.

Hot-melt adhesives can be applied to a substrate using methods well known to one of ordinary skill in the art. The acidic polymer and basic polymer can be blended and applied using melt extrusion techniques to form the hot-melt, thermally reversible crosslinked adhesive blend of the present invention.

The adhesive blend can be formed into an adhesive film or coating by either continuous or batch processes. An example of a batch process is the placement of a portion of the blend between a substrate to which the film or coating is to be adhered and a surface capable of releasing the adhesive film or coating to form a composite structure. The composite structure can then be compressed at a sufficient temperature and pressure to form an adhesive coating or layer of a desired thickness after cooling. Alternatively, the adhesive blend can be compressed between two release surfaces and cooled to form a heat-activatable adhesive film or a pressure-sensitive adhesive transfer tape useful in laminating applications.

Continuous forming methods include drawing the hot-melt adhesive system out of a film die and subsequently contacting the drawn adhesive blend to a moving plastic web or other suitable substrate. A related continuous method involves extruding the adhesive blend and a coextruded backing material from a film die and cooling the layered product to form an adhesive tape. Other continuous forming methods involve directly contacting the adhesive blend to a,rapidly moving plastic web or other suitable preformed substrate. Using this method, the adhesive blend is applied to the moving preformed web using a die having flexible die lips, such as a rotary rod die. After forming by any of these continuous methods, the adhesive films or layers can be solidified by quenching using both direct methods (e.g., chill rolls or water baths) and indirect methods (e.g., air or gas impingement).

Although coating out of solvent is not preferred, blends can be coated using a solvent-based method. For example, the blend can be coated by such methods as knife coating, roll coating, gravure coating, rod coating, curtain coating, and air knife coating. The coated solvent-based adhesive blend is then dried to remove the solvent and, if used, neutralizing agent. Preferably, the coated solvent-based adhesive blend is subjected to increased temperatures, such as those supplied by an oven, to expedite drying of the adhesive.

The cohesive strength of the resulting hot-melt adhesive develops upon cooling to ambient temperature after application. To further enhance cohesive strength of the adhesive, it may be useful to maintain the adhesive at elevated application temperatures for longer periods of time prior to cooling thereof. One way this can be accomplished is by heating the substrate on which the adhesive is coated.

The blends and polymers herein are exemplified in the following examples. These examples are merely for illustrative purposes only and are not meant to be limiting on the scope of the appended claims. The following data may, at times, show variability in results. This can be expected due to the various processing techniques utilized for preparing the samples. What is noteworthy, however, is the increased shear strength of the present hot-melt adhesives as compared to conventional, non-crosslinked hot-melt adhesives. All parts, percentages, ratios, etc. in the examples and the rest of the specification are by weight unless indicated otherwise.

TEST METHODS

Prior to testing, all samples were conditioned for about 24 hours in a constant temperature (23° C.), constant humidity (50% relative humidity) environment. Both the peel adhesion test and the shear strength test were performed under the same atmospheric conditions.

Peel Adhesion

Peel adhesion is the force required to remove an adhesive-coated, flexible sheet material from a test panel. Peel adhesion is measured at a specific angle and rate of removal. In the following examples, this peel adhesion force is expressed in Newtons/decimeter width (N/dm) of the coated sheet. Peel adhesion forces measured throughout are initial peel adhesion forces taken at about one minute dwell time, unless indicated to the contrary. These initial peel adhesion forces may not be indicative of aged peel adhesion forces that can be obtained.

The procedure followed was:

A strip (1.27 centimeter wide) of the adhesive-coated sheet was applied to the horizontal surface of a clean glass test plate with at least 12.7 lineal centimeter of both surfaces being in firm contact. One pass with a 2-kilogram hard rubber roller was used to apply the strip. The free end of the coated strip was doubled back nearly touching itself so the angle of removal was 180°. The free end was attached to the adhesion tester scale, The glass test plate was clamped in the jaws of a tensile testing machine that was capable of moving the plate away from the scale at a constant rate of 2.3 meters/minute. The scale reading was recorded in Newtons as the tape was peeled from the glass surface. The data was reported as the average of the range of numbers observed during the test.

Shear Strength

Shear strength is a measure of the cohesiveness, or internal strength, of an adhesive. Shear strength is based upon the amount of force required to pull an adhesive strip (tape) from a standard flat surface in a direction parallel to the surface to which it has been affixed with a definite pressure. Shear strength was measured as the time, in minutes, required to pull a standard area of adhesive-coated sheet material from a stailess steel test panel under the stress of a constant, standard load. This test followed the procedure described in ASTM D 3645M-88: "Holding Power of Pressure-sensitive Adhesive Tapes."

The tests were conducted at room temperature (about 22° C. to about 25° C.) on strips of adhesive-coated sheet material applied to a stainless steel panel. A 0.127 decimeter square portion of each strip was in firm contact with the panel and one end portion of the tape was free. The panel, with the adhesive-coated strip attached, was held in a rack such that the panel formed an angle of 178° with the extended free end of the adhesive-coated strip. The free end was tensioned by applying a force of 1,000 grams to the free end of the adhesive-coated strip. An angle of 2° less than 180° was used in order to negate any peel forces. Thus, only shear forces were measured. The elapsed time for each adhesive-coated strip to separate from the test panel was recorded as the shear strength. The test was discontinued after 10,000 minutes. The reported results are average values from testing two samples.

ABBREVIATIONS

| | |
|---|---|
| AA | acrylic acid |
| BA | n-butyl acrylate |
| DMAEMA | N,N-dimethylaminoethyl methacrylate |
| ECR-180 | a hydrogenated, synthetic hydrocarbon tackifier (commercially available from Exxon Co.; Houston, TX) |
| ESACURE KB-1 | 2,2-dimethoxy-1,2-diphenyl-1-ethanone photoinitiator (commercially available from Sartomer Co.; Exton, PA) |
| IOA | isooctyl acrylate |
| IRGANOX 1010 | pentaerythritol tetrakis(3,5-di-tert-butyl-4-hydroxyhydrocinnamate) antioxidant (commercially available from Ciba Geigy Corp.; Hawthorne, NY) |
| MMA | methyl methacrylate |
| ODA | octadecyl acrylate |
| SANTICIZER 160 | a butyl benzylphthalate plasticizer (commercially available from the Monsanto Co.; St. Louis, MO) |
| SEA | 2-sulfoethyl acrylate |
| VAZO 52 | 2,2'-azo-bis(2,4-dimethylpentanenitrile) initiator (commercially available from E.I. duPont de Nemours & Co.; Wilmington, DE) |
| VAZO 64 | azo-bis(isobutyronitrile) initiator (commercially available from E.I. duPont de Nemours & Co.; Wilmington, DE) |
| VAZO 67 | 2,2'-azo-bis(2-methylbutyronitrile) initiator (commercially available from E.I. duPont de Nemours & Co.; Wilmington, DE) |
| VAZO 88 | 1,1-azo-bis(cyclohexanenitrile) initiator (commercially available from E.I. duPont de Nemours & Co.; Wilmington, DE) |

ACIDIC POLYMERS

Acidic Copolymer A (90/10 IOA/AA by wt. %)—In a 100-milliliter glass bottle, 21.6 grams IOA, 2.4 grams AA, 0.028 gram carbon tetrabromide chain transfer agent, and 36 grams ethyl acetate were mixed. To this mixture, 0.072 gram VAZO 64 was added. The bottle was then made inert with nitrogen gas and sealed. The sealed bottle was tumbled in a 55° C. water bath for 24 hours. The resultant polymer had an inherent viscosity (IV) of 0.70 deciliter/gram (as measured in ethyl acetate at 25° C. at a polymer concentration of 0.2 gram/deciliter) and was coated on a siliconized polyester release liner. The coated solution was oven dried for 15 minutes at 65° C. to recover the dried polymer.

Acidic Copolymer B—(90/10 IOA/AA by wt. %) A 90/10 IOA/AA acidic acrylate copolymer was prepared as described by Hamer et al. in Examples 35 and 36 of PCT Publication No. WO 97/33945. A partially polymerized pre-adhesive composition was prepared by mixing 90 parts IOA, 10 parts AA, 0.15 parts per hundred (pph) ESACURE KB-1 photoinitiator, and 0.025 pph carbon tetrabromide chain transfer agent. The mixture was placed in a container and stirred while nitrogen gas was bubbled through the mixture to substantially exclude oxygen (i.e., to a level where polymerization was no longer inhibited, i.e., about 1,000 parts per million (ppm) or less). The mixture was irradiated with low intensity ultraviolet light (e.g., "black light" having a wavelength of about 300 nanometers to about 400 nanometers) until a viscous (i.e., having a viscosity of about 3,000 centipoise to about 5,000 centipoise), partially polymerized pre-adhesive composition was obtained.

The partially polymerized composition was knife-coated at a thickness of about 2.5 millimeters between two sheets of 50 micron-thick, ultraviolet-transparent, siliconized polyester film. The coated sandwich was passed through two low intensity UV-irradiation zones, where a total energy of 750 milliJoules/cm$^2$ was expended. Zone 1 provided an energy of approximately 112.5 milliJoules/cm$^2$ and a light intensity of 0.8 milliWatts/cm$^2$. Zone 2 provided an energy of approximately 637.5 milliJoules/cm$^2$ and a light intensity of 2.0 milliWatts/cm$^2$. During irradiation, the coated sandwich was cooled by air impingement to remove the heat generated during polymerization. After passing through the two exposure zones, the siliconized polyester sheets were removed from the sandwich to yield a solid acidic copolymer.

Acidic Copolymer C—(92/4/4 IOA/AA/SEA by wt. %) A 92/4/4 IOA/AA/SEA acidic copolymer was prepared by solution polymerization according to the method of Acidic Copolymer A, except that 22.1 grams IOA, 1.0 gram AA, and 1.0 gram SEA were initially mixed along with the initiator, chain transfer agent, and reaction solvent.

Acidic Copolymer D—(95/4/1/IOA/AA/SEA by wt. %) A 95/4/1 IOA/AA/SEA acidic copolymer was prepared by solution polymerization according to the method of Acidic Copolymer A, except that 22.8 grams IOA, 1.0 gram AA, and 0.2 gram SEA were initially mixed along with the initiator, chain transfer agent, and reaction solvent.

Acidic Copolymer E—(95/5 IOA/AA by wt. %) A 95/5 IOA/AA acidic copolymer was prepared as follows. To a stainless steel reactor was added about 517 parts of IOA, about 27 parts of AA, about 1 part of a 26.6% by weight solution of 4-acryloxy benzophenone (as prepared in Example A of U.S. Pat. No. 4,737,559) dissolved in ethyl acetate, 0.00925 parts of VAZO 52, 0.544 parts of IRGANOX 1010, and 0.272 parts of isooctyl thioglycoate. The reaction mixture was purged with nitrogen for about 25 minutes. Next, the reactor was pressurized to 68.9 kiloPascals (10 psig) with nitrogen. The reaction mixture temperature was set to about 63° C. (145° F.) and the mixture was agitated at 75 revolutions per minute (rpm). After the reaction began, the temperature increased adiabatically and peaked at about 143° C. (290° F.).

The mixture was cooled to about 54° C. (130° F.). Then, 0.0218 parts VAZO 52, 0.0435 parts VAZO 88, 0.0100 parts di t-butyl peroxide, 0.136 parts isooctyl thioglycoate, 3.069 parts of a 26.6% by weight solution of 4-acryloxy benzophenone (as prepared in Example A of U.S. Pat. No. 4,737,559), and about parts of IOA were added to the reaction mixture and mixed at about 75 rpm. The reactor was then pressurized to about 137.9 kiloPascals (20 psig) with nitrogen. The reaction mixture temperature was adjusted to about 63° C. (145° F.). After the reaction began, the temperature increased adiabatically and peaked at about 166° C. (330° F.). The reaction product was drained.

Acidic Copolymer F—(89/1.2/9.8 IOA/DMAEMA/AA by wt. %) A 89/1.2/9.8 IOA/DMAEMA/AA acidic copolymer was prepared by solution polymerization according to the method of Acidic Copolymer A, except that no chain transfer agent was added.

Acidic Polymer G—(100 AA by wt. %) 5,000 weight average molecular weight polyacrylic acid was used. This polymer is commercially available from Aldrich Chemical Company; Milwaukee, Wis., as 50% solids in water that can be dried prior to use.

BASIC POLYMERS

Basic Copolymer H—(80/10/10 DMAEMA/MMA/ODA by wt. %) To a stainless steel reactor was added about 92 parts of DMAEMA, about 12 parts of ODA, and about 12 parts of MMA. To this was added 0.0472 parts VAZO 52, 0.0118 parts VAZO 67, and 0.236 parts IRGANOX 1010 dissolved in about 0.9 parts of DMAEMA. The reaction mixture was purged with nitrogen for about 20 minutes. The reactor was then pressurized to 206.8 kiloPascals (30 psig) with nitrogen. The reaction mixture temperature was set to about 63° C. (145° F.) and the mixture was agitated at 75 rpm. After reaction began, the temperature increased adiabatically and peaked at about 146° C. (295° F.).

The mixture was cooled to about 54° C. (130° F.). Then, 0.0472 parts VAZO 52, 0.0236 parts VAZO 67, and 0.0236 parts VAZO 88 dissolved in about 1.4 parts of DMAEMA were added to the reaction mixture. The reactor was pressurized to about 206.8 kiloPascals (30 psig) with nitrogen. The reaction mixture temperature was adjusted to 63° C. (145° F.) and the mixture was agitated at 75 rpm. After the reaction began, the temperature peaked adiabatically at about 161° C. (322° F.). The reaction product was drained.

Basic Copolymer I—(90/10 IOA/DMAEMA by wt. %) A 90/10 IOA/DMAEMA basic copolymer was prepared by solution polymerization according to the method of Acidic Copolymer A, except that 21.6 grams IOA and 2.4 grams DMAEMA were initially mixed along with the initiator and reaction solvent. Also, no chain transfer agent was used.

Basic Copolymer J—(40/60 IOA/DMAEMA by wt. %) A 40/60 IOA/DMAEMA basic copolymer was prepared by solution polymerization according to the method of Acidic Copolymer A, except that 9.6 grams IOA and 14.4 grams DMAEMA were initially mixed along with the initiator and reaction solvent. Also, no chain transfer agent was used.

Basic Copolymer K—(40/60 ODA/DMAEMA by wt. %) A 40/60 ODA/DMAEMA basic copolymer was prepared by solution polymerization according to the method of Acidic Copolymer A, except that 9.6 grams ODA and 14.4 grams DMAEMA were initially mixed along with the initiator and reaction solvent. Also, no chain transfer agent was used.

Basic Copolymer L—(40/58/2 IOA/DMAEMA/AA by wt. %) A 40/58/2 IOA/DMAEMA/AA basic copolymer was prepared by solution polymerization according to the method of Acidic Copolymer A, except that 9.6 grams IOA and 13.9 grams DMAEMA and 0.5 gram AA were initially mixed along with the initiator and reaction solvent. Also, no chain transfer agent was used.

BLENDING AND APPLICATION METHODS

Hot-Melt Compounding and Coating (Method A)—The acidic polymer was fed into a BONNOT extruder (available from Bonnot Co.; Uniontown Ohio), which was linked to an 18 millimeter diameter, co-rotating twin screw LEISTRITZ extruder having a 30:1 length:diameter ratio and six zones (available from Leistritz Corporation; Allendale, N.J.). The temperatures of the BONNOT extruder, melt pump, LEISTRITZ extruder and die were set at 175° C. The acidic polymer was pumped into the first zone of the LEISTRITZ extruder. The basic polymer was then fed into the second zone of the LEISTRITZ extruder using a K-TRON LOSS-IN-WEIGHT feeder (available from K-Tron Corp.; Pitman, N.J.). The blend was then hot-melt coated, using a rotary rod die onto a 38-micron-thick, polyester film backing (primed with an aminated polybutadiene) or onto a siliconized polyester release liner, as noted in the Examples following. Samples coated onto the siliconized polyester release liner were then laminated onto a polyester backing (primed with an aminated polybutadiene) for testing.

Batch Compounding/Hot-melt Coating (Method B)—The acidic polymer, basic polymer, and optional tackifiers and plasticizers were blended in the stated ratios in a batch process at 1 50C. for 10 minutes using a BRABENDER PREP CENTER equipped with a 350-milliliter bowl mixer (available from C.W. Brabender Instruments, Inc.; South Hackensack, N.J.). The blend was then fed into a HAAKE single screw extruder (commercially available from Haake, Inc.; Paramus, N.J.) and hot-melt coated, using a draw die, onto a polyester film backing (primed with an aminated polybutadiene).

Batch Compounding/Hot-melt Pressing (Method C)—The acidic polymer and basic polymer were blended at 150° C. for 10 minutes in the ratios stated below in a batch process using a BRABENDER PREP CENTER equipped with a 30-milliliter bowl mixer (available from C.W. Brabender Instruments, Inc.; South Hackensack, N.J.). The polymer blends were then pressed between two standard, siliconized polyethylene terephthalate release liners at 150° C. and a pressure of about 138 MegaPascals (20,000 psi) using a CARVER hydraulic press, without shims, (available from Carver, Inc.; Wabash, Ind.), such that a thin layer was formed. The thickness of each sample varied from about 25 microns to about 150 microns, with the actual thickness of each sample being indicated below. The pressed samples were then laminated to a 38-micron-thick, polyester film backing, primed with an aminated polybutadiene, for peel adhesion and shear strength testing.

EXAMPLES

Processed by Method A

Examples 1–9 and Comparative Example C1

Blends of Acidic Copolymer A and Basic Copolymer H were compounded and coated according to Method A in the relative amounts listed in Table 1. The coating thickness for each example is also listed in Table 1. Tape samples for Examples 3, 6, 9, and C1 were hot-melt coated onto the primed polyester backing, while tape samples for Examples 1, 2, 4, 5, 7 and 8 were first hot-melt coated onto a siliconized release liner and then laminated onto the primed polyester backing. The samples were tested according to the above shear strength methods. Tape samples 3, 6, and 9 were also tested for peel adhesion after being aged for one week at a temperature of 23° C. and a relative humidity of 50%.

TABLE 1

| Ex. | Acidic Copolymer A (10% acidic monomers) (parts) | Basic Copolymer H (80% basic monomers) (parts) | Coating Thickness (microns) | Peel Adhesion (N/dm) Initial | Peel Adhesion (N/dm) Aged | Shear Strength (min.) |
|---|---|---|---|---|---|---|
| 1 | 100 | 0.8 | 38 | 33 | — | 527 |
| 2 | 100 | 0.8 | 125 | 64 | — | 1,306 |
| 3 | 100 | 0.8 | 38 | 56 | 108 | 1,079 |
| 4 | 100 | 1.5 | 38 | 18 | — | 2,687 |
| 5 | 100 | 1.5 | 125 | 22 | — | 5,982 |
| 6 | 100 | 1.5 | 38 | 26 | 77 | 6,124 |
| 7 | 100 | 2.9 | 38 | 2 | — | 10,000+ |
| 8 | 100 | 2.9 | 125 | 4 | — | 10,000+ |
| 9 | 100 | 2.9 | 38 | 4 | 11 | 10,000+ |
| C1 | 100 | 0 | 63 | 77 | — | 27 |

Examples 1–9 show significant increases in shear strength of Acidic Copolymer A (cf., Comparative Example C1) due to the addition of minor amounts of the basic copolymer having a relatively high level of basic comonomer. The shear strength results obtained are relatively independent of coating thickness. These results illustrate that adhesive blends can be formulated to display a broad range of peel adhesion and shear strength properties.

Processed by Method B

Examples 10–11

Adhesive blends for Examples 10–11 were formulated according to the ratios of Acidic Copolymer A, Basic Copolymer H, tackifier (ECR-180) and plasticizer (SANTICIZER 160) found in Table 2. The coating thickness for each example is listed in Table 2. The tape samples were tested according to the above peel adhesion and shear strength methods.

TABLE 2

| Ex | Acidic Copolymer A (10% acidic monomer) (parts) | Basic Copolymer H (80% basic monomer) (parts) | Tackifier (parts) | Plasticizer (parts) | Coating Thickness (microns) | Peel Adhesion (N/dm) | Shear Strength (min.) |
|---|---|---|---|---|---|---|---|
| 10 | 100 | 2 | 15 | 5 | 150 | 18 | 6,444 |
| 11 | 100 | 1.5 | 0 | 0 | 150 | 13 | 4,802 |

Example 12 and Comparative Example C2

Adhesive blends for Examples 12 and C2 were formulated according to the ratios of Acidic Copolymer A and Basic Copolymer K found in Table 3. The coating thickness for each Example is listed in Table 3. The tape samples were tested according to the above peel adhesion and shear strength methods.

TABLE 3

| Ex. | Acidic Copolymer A (10% acidic monomer) (parts) | Basic Copolymer K (60% basic monomer) (parts) | Coating Thickness (microns) | Peel Adhesion (N/dm) | Shear Strength (min.) |
|---|---|---|---|---|---|
| 12 | 100 | 2 | 60 | 21 | 4,467 |
| C2 | 100 | 0 | 50 | 31 | 33 |

Processed by Method C

Example 13 and Comparative Examples C3–C6

Blends were formulated according to the ratios of Acidic Copolymer A and Basic Copolymer I or H found in Table 5 and compounded and pressed according to Batch Compounding and Hot-melt Pressing Method C. The coating thickness for each example is also listed in Table 5. The tape samples were tested according to the above peel adhesion and shear strength methods.

TABLE 5

| Ex. | Acidic Copolymer A (10% acidic monomer) (parts) | Basic Copolymer I (10% basic monomer) (parts) | Coating Thickness (microns) | Peel Adhesion (N/dm) | Shear Strength (min.) |
|---|---|---|---|---|---|
| C3 | 100 | 0 | 150 | 88 | 17 |
| C4 | 100 | 10 | 50 | 53 | 254 |
| C5 | 100 | 20 | 63 | 59 | 464 |
| C6 | 100 | 30 | 50 | 48 | 1,528 |

| Ex. | | Basic Copolymer H (80% basic monomer) (parts) | Coating Thickness (microns) | Peel Adhesion (N/dm) | Shear Strength (min.) |
|---|---|---|---|---|---|
| 13 | 100 | 1.5 | 38 | 57 | 10,000+ |

Examples 14–16 and Comparative Examples C7–C9

Blends were formulated according to the ratios of the Acidic Copolymer (C, D, or E) and Basic Copolymer (H) found in Table 6 and compounded and pressed according to Batch Compounding and Hot-melt Pressing Method C. The coating thickness for each example is also listed in Table 6. The tape samples were tested according to the above peel adhesion and shear strength methods.

TABLE 6

| Ex. | Acidic Copolymer (100 parts) | Basic Copolymer H (80% basic monomers) (parts) | Coating Thickness (microns) | Peel Adhesion (N/dm) | Shear Strength (min.) |
|---|---|---|---|---|---|
| 14 | C (8% acidic monomers-4% AA, 4% SEA) | 2 | 125 | 53 | 1,832 |
| C7 | C (8% acidic monomers-4% AA, 4% SEA) | 0 | 50 | 81 | 87 |
| 15 | D (5% acidic monomers-4% AA, 1% SEA) | 2 | 75 | 42 | 2,206 |
| C8 | D (5% acidic monomers-4% AA, 1% SEA) | 0 | 100 | 99 | 11 |
| 16 | E (5% acidic monomers-5% AA) | 3.5 | 50 | 49 | 9 |
| C9 | E (5% acidic monomers-5% AA) | 0 | 55 | 85 | 1 |

Examples 17 and Comparative Example C10

Blends of Acidic Polymer G and Basic Copolymer J were hot-melt compounded and coated according to Method C in the relative amounts listed in Table 7. The coating thickness for each sample is also listed in Table 7. The samples were tested according to the above shear strength methods.

TABLE 7

| Ex. | Acidic Polymer G (100% acidic monomers) (parts) | Basic Copolymer J (60% basic monomers) (parts) | Coating Thickness (microns) | Shear Strength (min.) |
|---|---|---|---|---|
| 17 | 20 | 100 | 38 | 184 |
| C10 | 0 | 100 | 38 | 5 |

As can be seen from Table 7, the addition of an acidic homopolymer to a basic copolymer can substantially increase the shear strength of the basic copolymer.

Example 18 and Comparative Example C4

Blends of Acidic Polymer A and Basic Copolymer J were hot-melt compounded and coated according to Method C in the relative amounts listed in Table 8. The coating thickness for each sample is also listed in Table 8. The samples were tested according to the above shear strength methods.

TABLE 8

| Ex | Acidic Polymer A (10% acidic monomers) (parts) | Basic Copolymer L (58% basic monomers; 2% acidic monomers) (parts) | Coating Thickness (microns) | Shear Strength (min.) |
|---|---|---|---|---|
| 18 | 100 | 2 | 150 | 801 |
| C4 | 100 | 0 | 150 | 17 |

As can be seen from Table 8, in blends of the present invention, one of the acidic or basic polymer can be a copolymer that is derived from both acidic and basic monomers.

Example 19 and Comparative Example C11

For Example 19, a blend of Acidic Polymer A and Basic Copolymer J was hot-melt compounded and coated according to Method C in the relative amounts listed in Table 9. The coating thickness is also listed in Table 9. The sample was tested according to the above shear strength method.

The proportionate amount of basic monomers in the polymer of Comparative Example C11 is similar to that in the polymeric blend of Example 19. Similarly, the proportionate amount of acidic monomers in the polymer of Comparative Example C11 is similar to that in the polymeric blend of Example 19.

TABLE 9

| Ex. | Acidic Polymer (100 parts) | Basic Copolymer J (60% basic monomers) (parts) | Coating Thickness (microns) | Shear Strength (min.) |
|---|---|---|---|---|
| 19 | A (10% acidic monomers) | 2 | 150 | 10,000+ |
| C11 | F (9.8% acidic monomers; 1.2% basic monomers) | 0 | 125 | 182 |

Example 20 and Comparative Example C12

In Example 20, an acidic polymer (Acidic Copolymer B) was blended with a basic polymer (Basic Copolymer H). The blends of Example 20 were processed according to Method C in the relative amounts listed in Table 10. The coating thickness for each sample is also listed in Table 10. The samples were tested according to the above peel adhesion and shear strength methods.

TABLE 10

| Ex | Acidic Copolymer B (10% acidic monomer) (parts) | Basic Copolymer H (80% basic monomer) (parts) | Tackifier (parts) | Plasticizer (parts) | Coating Thickness (microns) | Peel Adhesion (N/dm) | Shear Strength (min.) |
|---|---|---|---|---|---|---|---|
| 20 | 100 | 1 | 15 | 5 | 100 | 94 | 10,000+ |
| C12 | 100 | 0 | 0 | 0 | 90 | 103 | 97 |

Various modifications and alterations of the invention will become apparent to those skilled in the art without departing from the spirit and scope of the invention, which is defined by the accompanying claims.

What is claimed is:

1. A hot-melt pressure-sensitive adhesive composition, comprising a blend of:
   an acidic copolymer derived from a first group of monomers comprising at least one acidic monomer; and
   a basic copolymer derived from a second group of monomers comprising at least one basic monomer,
   wherein at least one of the first and second group of monomers comprises greater than 25% by weight of acidic or basic monomers, respectively, and
   wherein one of the acidic copolymer and the basic copolymer comprises up to about 5% by weight of the blend.
2. The composition of claim 1, wherein at least one of the first and second group of monomers comprises at least one (meth)acrylate monomer.
3. The composition of claim 2, wherein each of the first and second group of monomers comprises at least one (meth)acrylate monomer.
4. The composition of claim 2, wherein the (meth)acrylate monomer is an alkyl (meth)acrylate monomer.
5. The composition of claim 1, wherein the first group of monomers comprises at least one basic monomer.
6. The composition of claim 1, wherein the second group of monomers comprises at least one acidic monomer.
7. The composition of claim 1, wherein the first group of monomers is essentially free of basic monomers.
8. The composition of claim 1, wherein the second group of monomers is essentially free of acidic monomers.
9. The composition of claim 1, wherein the acidic monomer is selected from the group consisting of an ethylenically unsaturated carboxylic acid, an ethylenically unsaturated sulfonic acid, an ethylenically unsaturated phosphonic acid, and mixtures thereof.
10. The composition of claim 1, wherein the acidic monomer is selected from the group consisting of an ethylenically unsaturated sulfonic acid, an ethylenically unsaturated phosphonic acid, and mixtures thereof.
11. The composition of claim 1, wherein at least one of the first and second group of monomers comprises greater than about 35% by weight of acidic or basic monomers, respectively.
12. The composition of claim 11, wherein at least one of the first and second group of monomers comprises greater than about 50% by weight of acidic or basic monomers, respectively.
13. The composition of claim 12, wherein at least one of the first and second group of monomers comprises greater than about 60% by weight of acidic or basic monomers, respectively.
14. The composition of claim 1, wherein the basic monomer is a non-nucleophilic amine-functional monomer.
15. The composition of claim 14, wherein the basic monomer has a formula:

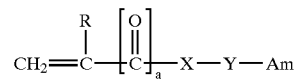

wherein
a is 0 or 1;
R is selected from the group consisting of H— and $CH_3$—;
X is selected from the group consisting of —O— and —NH—;
Y is a divalent linking group; and
Am is a tertiary amine fragment.

16. The composition of claim 15, wherein Am is a group:

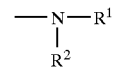

wherein $R^1$ and $R^2$ are independently selected from the group consisting of an alkyl group, an aryl group, a cycloalkyl group, and an arenyl group.

17. The composition of claim 16, wherein Am is selected from the group consisting of pyridinyl and imidazolyl.

18. The composition of claim 15, wherein Y is selected from the group consisting of —(CH$_2$)$_n$—, wherein n represents an integer of 1 to 5; and divalent alkyl groups having internal linkages selected from the group consisting of ether linking groups, thioether linking groups, keto linking groups, urea linking groups, urethane linking groups, amido linking groups, and combinations thereof.

19. The composition of claim 1, wherein the basic monomer is selected from the group consisting of N,N-dimethylaminopropyl methacrylamide (DMAPMAm), N,N-diethylaminopropyl methacrylamide (DEAPMAm), N,N-dimethylaminoethyl acrylate (DMAEA), N,N-diethylaminoethyl acrylate (DEAEA), N,N-dimethylaminopropyl acrylate (DMAPA), N,N-diethylaminopropyl acrylate (DEAPA), N,N-dimethylaminoethyl methacrylate (DMAEMA), N,N-diethylaminoethyl methacrylate (DEAEMA), N,N-dimethylaminoethyl acrylamide (DMAEAm), N,N-dimethylaminoethyl methacrylamide (DMAEMAm), N,N-diethylaminoethyl acrylamide (DEAEAm), N,N-diethylaminoethyl methacrylamide (DEAEMAm), 4-(N,N-dimethylamino)-styrene (DMAS), 4-(N,N-diethylamino)-styrene (DEAS), N,N-dimethylaminoethyl vinyl ether (DMAEVE), N,N-diethylaminoethyl vinyl ether (DEAEVE), vinylpyridine, vinylimidazole, and mixtures thereof.

20. The composition of claim 1, wherein at least one of the first and second group of monomers comprises a vinyl monomer.

21. The composition of claim 1, wherein the second group of monomers comprises greater than 25% by weight of basic monomers.

22. The composition of claim 1, wherein one of the acidic copolymer and the basic copolymer comprises about 0.5% by weight to about 5% by weight of the blend.

23. A substrate at least partially coated with the composition of claim 1.

24. A tape comprising:
   a backing having a first and second side; and
   the composition of claim 1 coated on at least a portion of the first side of the backing and, optionally, on at least a portion of the second side of the backing.

* * * * *

UNITED STATES PATENT AND TRADEMARK OFFICE
CERTIFICATE OF CORRECTION

PATENT NO. : 6,720,387 B1
DATED : April 13, 2004
INVENTOR(S) : Stark, Peter A.

It is certified that error appears in the above-identified patent and that said Letters Patent is hereby corrected as shown below:

Title page,
Item [56], References Cited, U.S. PATENT DOCUMENTS, add the following:

```
-- 2,807,597  *  9/1957   Sonnenfeld et al. .......... 525/212
   2,921,043  *  1/1960   Vraneck ................ 525/209
   2,952,043  *  9/1960   Vranock et al. ............ 525/203
   3,028,259  *  4/1962   Webber ................ 525/221
   3,180,857  *  4/1965   Conciatori et al. .......... 525/218
   3,236,914  *  2/1966   Murdock et al. ............ 525/203
   4,585,820  *  4/1986   Defigo et al. ............. 525/218
   5,328,958  *  7/1994   Goo et al. ............. .. 525/209
   5,378,758  *  1/1995   Amici et al. ............ . 525/221
   5,545,826  *  8/1996   Amici et al. ............ . 525/212
   5,567,768  * 10/1996   Amici et al. ............ . 525/221
   5,599,872  *  2/1997   Sulewski ............... 525/221
   5,652,305  *  7/1997   Amici et al. ............. 525/221 --
```

FOREIGN PATENT DOCUMENTS, add the following:
-- JP 36441      *       2/1987...................525/203 --.
OTHER PUBLICATIONS, "Beaulieu, Ann Hecht," reference, delete "Hot Melt" and insert in place thereof -- Hot-Melt --.

Column 1,
Line 33, after "of " delete "the".

Column 4,
Line 7, delete "dimethylamino" and insert in place thereof -- diethylamino --.

Column 8,
Line 45, delete "—CH($^3$)$_2$" and insert in place thereof -- "—CH(R$^3$)$_2$ --.

Column 9,
Line 14, delete "Maiden" and insert in place thereof -- Malden --.

Column 10,
Line 49, delete "isobomyl" and insert in place thereof -- isobornyl --.
Line 55, delete "metbacrylate" and insert in place thereof -- methacrylate --.

Column 11,
Line 42, delete "0C" and insert in place thereof -- 0°C --.

Column 14,
Line 39, after "thereof" insert -- . --.

UNITED STATES PATENT AND TRADEMARK OFFICE
CERTIFICATE OF CORRECTION

PATENT NO. : 6,720,387 B1
DATED : April 13, 2004
INVENTOR(S) : Stark, Peter A.

It is certified that error appears in the above-identified patent and that said Letters Patent is hereby corrected as shown below:

Column 15,
Line 19, after "can" delete "is".

Column 16,
Line 58, delete "a,rapidly" and insert in place thereof -- a rapidly --.

Column 17,
Line 56, delete "scale," and insert in place thereof -- scale. --.

Column 18,
Line 5, delete "stailess" and insert in place thereof -- stainless --.

Column 19,
Line 66, after "about" insert -- 5 --.

Column 21,
Line 22, delete "1 50C" and insert in place thereof -- 150° --.

Signed and Sealed this

Sixth Day of September, 2005

JON W. DUDAS
*Director of the United States Patent and Trademark Office*